UNITED STATES PATENT OFFICE.

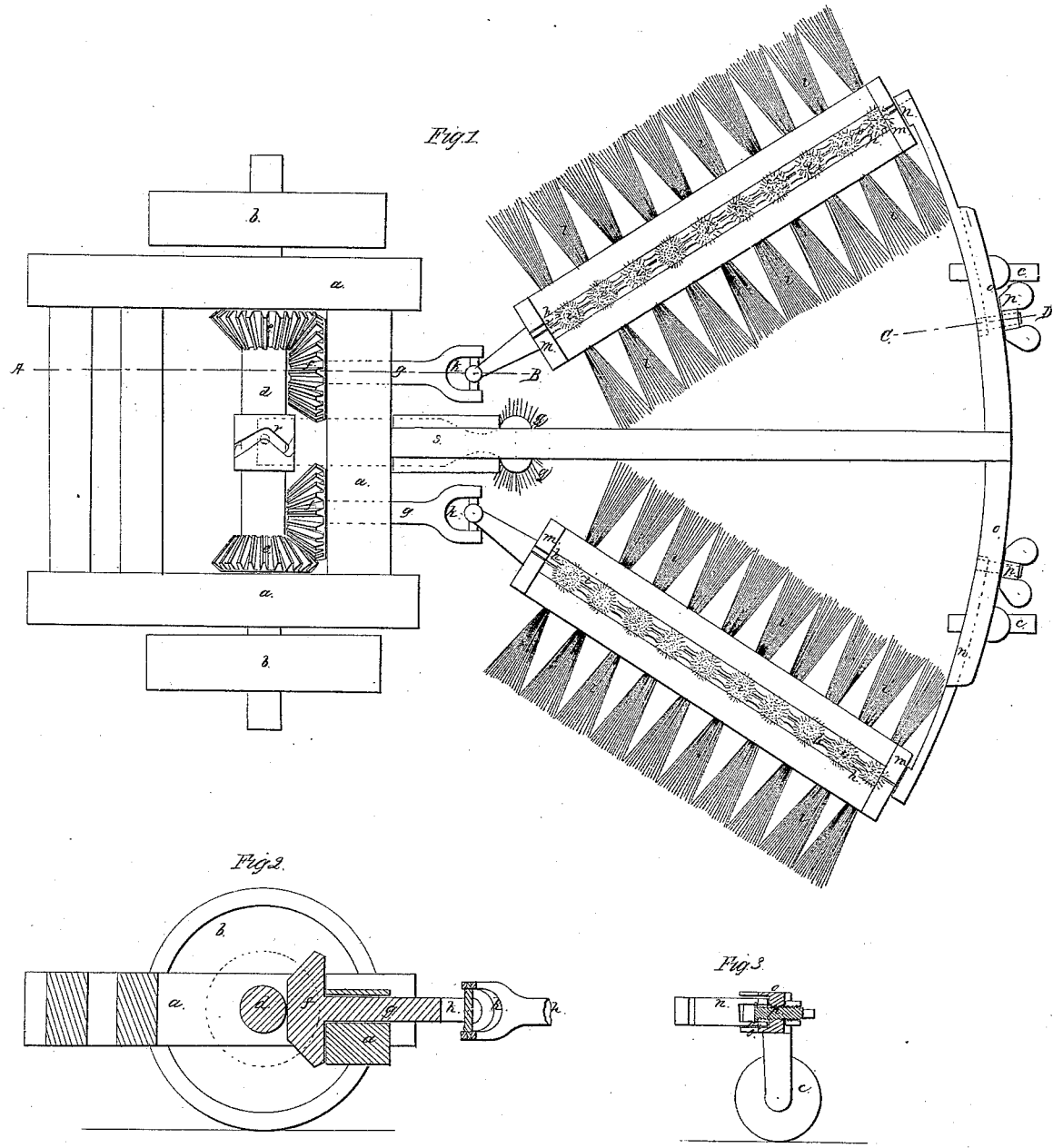

JOHN CRITCHERSON, OF BOSTON, MASSACHUSETTS.

STREET-SWEEPING MACHINE.

Specification of Letters Patent No. 18,195, dated September 15, 1857.

*To all whom it may concern:*

Be it known that I, JOHN CRITCHERSON, of Boston, in the county of Suffolk and State of Massachusetts, have invented certain new and useful Improvements in Street-Sweeping Machines, and that the following description, taken in connection with the accompanying drawings hereinafter referred to, forms a full and exact specification of the same, wherein I have set forth the nature and principles of my said improvements by which my invention may be distinguished from others of a similar class, together with such parts as I claim and desire to have secured to me by Letters Patent.

The figures of the accompanying plate of drawings represent my improvements.

Figure 1, is a plan or top view of my improved street sweeping machine. Fig. 2, is a sectional view in detail taken in the plane of the line A B. Fig. 3, is a similar view taken in the plane of the line C, D.

The present invention in street sweeping machines consists in a new arrangement of mechanical devices whereby the brushes are so arranged and operated as to adapt the machine to streets of various widths or to sweeping a wide or narrow space, the adjustment of the brushes for this purpose being effected with the greatest ease and quickness. In my improved machine the brushes are arranged upon a diagonal shaft which receives its rotary motion from the driving wheels through a universal joint that communicates the necessary motion to the shaft and at the same time allows it to swivel or play laterally, the end of the shaft opposite to the universal joint, traveling in the arc of a circle, at any desired point of which it can be set so as to vary at pleasure the angle of the shaft upon which the brushes are placed.

*a, a, a,* in the drawings represent the supporting frame work or carriage of the machine resting upon wheels *b, b, c, c*. *b, b,* are the driving wheels upon the shaft *d* of which are placed bevel gears *e e* that engage with similar gears *f, f,* attached to short shafts *g, g,* the ends of which together with the ends of the diagonal shafts *h, h,* upon which the brushes *i, i,* &c., are placed form universal joints *k, k*. The brushes *i, i,* &c., are secured between plates *l, l,* attached to the shafts *h, h,* by the end bearings *m, m*.

If desirable the plates *l, l,* may be made adjustable in their end bearings *m, m,* so that they can be extended out as the brushes become worn and fastened by a set screw or otherwise. The ends of the diagonal shafts *h, h,* opposite to the universal joints, have their bearings in two curved slotted bars *n, n,* Figs. 1 and 3 that travel in the grooved arc *o, o,* being fastened in any desired position therein, by set screws *p, p,* so that the diagonal shafts *h, h,* can be placed at any desired angle.

From the foregoing description it will be seen that by imparting the rotary motion to the shaft upon which the brushes are placed by means of a swivel or universal joint upon one end of the said shaft, and its opposite end being set in or out so as to increase or diminish the angle of the two sets of brushes, the machine is adapted to sweeping streets of various widths, as the width of the space which the brushes will occupy can be increased or diminished at a moment's notice.

*q, q,* is a central brush which may or may not be used, at pleasure. It is designed to sweep the central space that might not be reached by the brushes *i, i,* &c., and has a lateral movement imparted to it by a cam *r* upon the driving shaft *d,* and the horizontal bar *s,* shown by dotted lines in Fig. 1.

Having thus described my improvements I shall state my claim as follows:

What I claim as my invention and desire to have secured to me by Letters Patent is—

The improvement in street-sweeping machines which consists in the combination of the adjustable sliding bars, traveling in the arc of a circle, with the universal joints for driving the diverging shafts upon which the brushes are arranged, whereby the sweeping apparatus is adapted to streets of various widths.

JOHN CRITCHERSON.

Witnesses:
JOSEPH GAVETT,
EZRA LINCOLN.